United States Patent
Thompson et al.

[11] 3,867,232
[45] Feb. 18, 1975

[54] ULTRASONIC SPLICING APPARATUS

[75] Inventors: David L. Thompson, West Henrietta; Everett B. Wardell, LeRoy, both of N.Y.

[73] Assignee: Eastman Kodak Company, Rochester, N.Y.

[22] Filed: May 22, 1972

[21] Appl. No.: 255,353

[52] U.S. Cl.................. 156/502, 156/580, 156/73
[51] Int. Cl........................ B31f 5/00, B32b 31/20
[58] Field of Search .............. 156/580, 73, 289, 502

[56] References Cited
UNITED STATES PATENTS

| | | | |
|---|---|---|---|
| 3,308,003 | 3/1967 | Deans | 156/580 |
| 3,426,951 | 2/1969 | Pohlman | 228/1 |
| 3,440,118 | 4/1969 | Obeda | 156/73 |
| 3,457,132 | 7/1969 | Tuma et al. | 156/580 |
| 3,464,102 | 9/1969 | Soloff | 156/580 |
| 3,480,505 | 11/1969 | Donnell, Jr. et al. | 156/498 |
| 3,628,716 | 12/1971 | Fastre | 156/73 |
| 3,666,602 | 5/1972 | Obeda | 156/580 |
| 3,728,183 | 4/1972 | Wasco et al. | 156/73 |
| 3,737,361 | 6/1973 | Obeda | 156/580 |

Primary Examiner—George F. Lesmes
Assistant Examiner—Stanley S. Silverman
Attorney, Agent, or Firm—H. M. Chapin

[57] ABSTRACT

Two webs of photographic film or paper having thermoplastic resin surfaces are lap spliced ultrasonically on an anvil, using an ultrasonic horn having a pair of thin bosses projecting from the end surface thereof at positions to engage either the side edges of the webs or, if plastic extrusion at the edges must be avoided, at points spaced about 1/16 inch – ⅛ inch inwardly of the edges. Energy concentration occurs at the bosses, assuring a strong union at the edges of the webs. Energy concentration is further improved and separation of the horn from the web assured by providing a coating of polymeric releasing material such as Teflon polytetrafluoroethylene on the end surface of the horn (including the bosses). Advantageously the polymeric releasing material is carried by a fibrous material such as fiberglass tape which adheres to the face of the horn. The bosses can be on the anvil instead of the horn; or one can be on the anvil and one of the horn. The resulting spliced product has a uniformly strong joint across its width, having a shear strength of at least 12 pounds. Teflon is a trademark of E. I. du Pont de Nemours & Company.

8 Claims, 3 Drawing Figures

PATENTED FEB 18 1975

3,867,232

3,867,232

ULTRASONIC SPLICING APPARATUS

BACKGROUND OF THE INVENTION

1. Field of the Invention

The present invention relates to a novel method of and apparatus for ultrasonically splicing together two webs, such as photographic film or paper, having juxtaposed overlapping surfaces thereof comprising a thermoplastic resin material. The invention also relates to the spliced webs as a novel product.

2. The Prior Art

The ultrasonic lap splicing of thermoplastic webs is well known. While the general principles have been applied successfully, we have found that when splicing together the overlapping ends of two webs of photographic paper having thermoplastic resin surfaces, the splice or joint on the internal portions of the joined webs is strong, but there is a tendency for the splice to be weaker than is desired adjacent to the side edges of the splice. When such splices were accomplished in accordance with the prior art, the joined webs often appeared to be adequately joined together, but upon applying a shear strength test it was found that some splices tended to break apart under a load of between 4 and 7 pounds, whereas shear strengths of 12–16 pounds are desired to assure that the webs will remain joined while they are being processed by passing them through photographic processing solutions, or by the application of various photographic compositions in layers thereon. Such processing requires webs to pass over numerous rollers, with rather sharp bends occurring around some of the rollers, and high strength is essential to resist such bending, especially when wet by processing solutions.

Furthermore, when ultrasonically splicing such webs which carry a layer of photographic emulsion over one of the thermoplastic resin surface, emulsion tends to build up on the ultrasonic horn and hinders the operation unless the horn is frequently cleaned.

SUMMARY OF THE INVENTION

In accordance with our invention an improved and consistently strong joint across the entire width is secured by ultrasonically splicing overlapping webs having at least their surfaces comprising a thermoplastic resin material such as polyethylene, polypropylene, cellulose esters such as cellulose acetate, and poly(ethylene terephthalate). This is done by overlapping the ends of the two webs slightly, with their thermoplastic surfaces in contact with one another, and applying an ultrasonically vibrating horn to one of the webs while the other is in contact with a stationary anvil, in such a way that the ultrasonic energy is more concentrated adjacent the side edges of the overlapped webs than at the interior localities remote from the edges, thus assuring a strong union of the webs at the side edges and across the entire width.

Our preferred way for concentrating the energy adjacent the edges is to employ an ultrasonic horn member having a generally rectangular end surface for engaging the webs, and providing on the end surface a pair of slightly projecting parallel bosses adjacent the two edges of the end surface which are adapted to contact the side edges of the overlapped web. These bosses may be located directly at such edges of the horn end surface so as to be applied directly at the edges of the webs, thereby producing an extremely strong splice. However, it has been found that a small quantity of plastic tends to be squeezed out sideways to form protrusions along the edges of the webs, and this is detrimental for some products.

We have found that when such protrusions are objectionable, they can be eliminated by locating the two bosses at positions spaced slightly inwardly from the edges of the horn so that they are applied to areas spaced slightly from the edges of the overlapping webs.

Instead of providing the energy concentrating bosses on the end of the horn, they can be provided on the surface of the anvil adjacent the positions that the web edges assume during splicing, while the end of the horn is kept smooth and essentially flat; or one boss can be appropriately positioned on the horn and one on the anvil.

Energy concentration, and separation of the horn surface from the webs after splicing, are further assured by providing over the end surface of the horn a thin layer or coating of a polymeric releasing material such as a fluorocarbon (fluoroplastic) resin, for example polytetrafluoroethylene sold by duPont under the trademark Teflon and by other manufacturers under the trademarks Halon, Fluon, and Fluoroflex. DuPont Teflon brand of fluorinated ethylene-propylene resin (a copolymer of hexafluoropropylene and tetrafluoroethylene) can also be used as the releasing fluorocarbon. When the horn carries energy concentrating bosses, such as layer extends over the bosses also. Advantageously the layer of fluorocarbon is associated with a carrier tape such as fiberglass tape which adheres to the horn end.

THE DRAWINGS

THE PREFERRED EMBODIMENT

Figure 1:
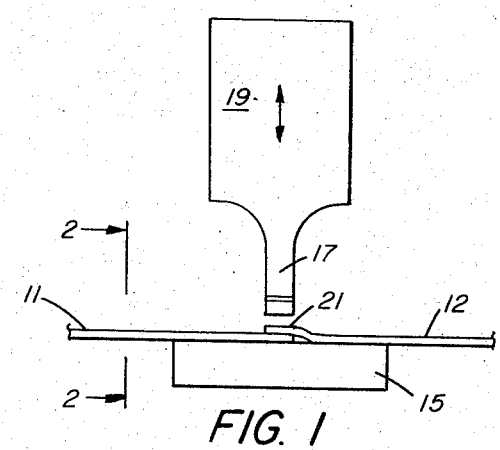
FIG. 1 is a side elevational view schematically showing an ultrasonic transducer and horn in position for splicing together two overlapping webs of photographic film or paper.

As shown in FIG. 1, two webs 11 and 12 of photographic paper whose outermost surfaces comprise coatings of polyethylene are positioned on the top of a metal anvil 15 with their ends in slightly overlapping relationship and with polyethylene coated surfaces in contact with one another.

An ultrasonic horn 17, of metal such as titanium alloy, projects from a vibration generating ultrasonic transducer 19 and is positioned with its bottom or end surface spaced above the overlapped area 21. The end surface of horn 17 is generally rectangular in shape with two parallel short edges adapted to be positioned adjacent the edges of the webs, and two parallel long edges adapted to extend across the width of the webs. In operation, transducer 19 is electrically energized to produce small amplitude vibrations, such as between 20,000 and 40,000 cycles per second, which are transmitted into the horn 17. Transducer 19 and horn 17 are then moved downwardly either manually or by machine (similar to a drill press) to bring the end of the horn into contact with web 12, and the intense vibrations cause the two contiguous layers of polyethylene to fuse together and provide a strong splice. The horn is not translated across the surface of the web. Then transducer 19 and horn 17 are moved upwardly to their original position and the spliced web is removed. Transducer 19 can be of either the magnetostrictive or piezoelectric type, well known in the art.

Figure 2:
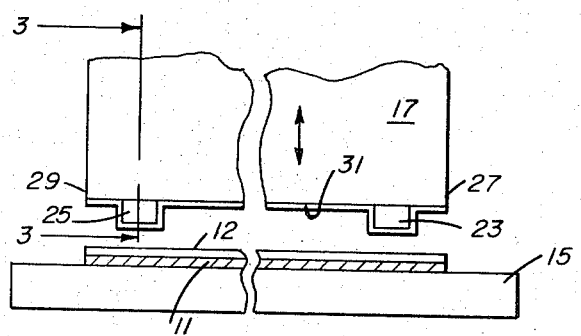
FIG. 2 is an elevational view, partly in section, of the apparatus of FIG. 1 as viewed from the line 2—2, on a greatly exaggerated scale.
Figure 3:
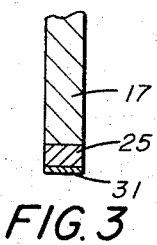
FIG. 3 is a vertical sectional view of the ultrasonic horn taken along the line 3—3 in FIG. 2.

As shown on an exaggerated scale in FIG. 2, horn 17 is provided with two bosses 23 and 25, for example of shim stock up to about 0.005 inch thick (advantageously about 0.002 to 0.005 inch thick), which are located adjacent to, but spaced slightly from, the shorter side edges 27 and 29 of the horn's end surface, for example 1/16 inches to ⅛ inches from the edges. Bosses 23 and 25 can be of metal or plastic shim stock, and can be adhesively joined to the planar end surface of horn 17, as by duPont Carbolene F 1 Cement, or other suitable adhesive cement. Alternatively, bosses 23,25 can be formed integrally with the horn 17 by chemical or mechanical forming techniques.

In order to assist in concentrating the ultrasonic energy, to assure parting of the end of horn 17 from the splice after its completion, and to avoid build-up of photographic emulsion on the horn when splicing webs having such emulsion over a layer of polyethylene or other thermoplastic resin, the entire end surface of the horn (including bosses 23,25) advantageously is covered with a coating or layer 31 of a releasing plastic such as Teflon polytetrafluoroethylene or the other fluoroplastics mentioned previously. We have found that this coating can be applied by pressing on a commercially available pressure sensitive Teflon tape having a tacky adhesive material on one surface which adheres to the material of the horn and the bosses. Thus, the parts of the tape over bosses 23 and 25 form bosses which project from the rest of the horn end the same distance as the thickness of 23,25. Other techniques can be employed as is well known for this material, such as by applying it in molten form, or as a water slurry from which the water is allowed to evaporate, or even by glow discharge sputtering of Teflon powder onto the end surface of the horn. The device is operable successfully without this coating, using just the bosses 23,25 for energy concentration, but the Teflon coating does improve the operation by improving parting and by avoiding the accumulation of photographic emulsion on the horn when present on the paper.

In a typical example of how this method and apparatus are employed, the rectangular end surface of horn 17 was 3 ½ inches in its longer dimension and ¼ inches in its shorter dimension; and the bosses 23 and 25 were 1/16 inches wide and ¼ inches long pieces of 0.003 inches thick plastic shim stock extending parallel to the shorter edges 27, 29 of the horn and spaced ⅛ inches therefrom. The end surface of the horn (including the two bosses) was completely covered with 0.0095 inches fiber glass Teflon tape having a pressure sensitive adhesive backing, purchased as Dodge Fiber Fluor-Glass M-281-6R from Dodge Industries, Hoosick Falls, N.Y.

Upon splicing polyethylene coated webs of photographic paper 3 ½ inches wide, and overlapping 7/32 inches at their ends, successful splices were obtained which not only withstood shear stresses between 12 and 16 pounds without separating at the edges, but also were free from protruding polyethylene along the edges of the joined webs. The polyethylene on one side of the webs was coated under photographic emulsion and it was observed that emulsion did not build up on the horn as tends to occur without Teflon or the like. The horn was vibrating at about 20,000 cycles per second, and the power input to the horn was about 300 watts from a Branson Model J32AK power supply, Model KSK Convertor.

The shear stress was determined in an Instron tensile testing machine, but with the paper wrapped at one end adjacent the splice around a cylinder which was tilted at 12° to the horizontal (78° to the pull direction) so that one edge of the splice purposely broke first. The paper was first thoroughly wet with a solution of water and alcohol to simulate photographic developer conditions.

In identical splicing operations, but using a horn having the bosses 23 and 25 immediately at the edges 27 and 29, equally strong splices were secured, but some protrusion of polyethylene beyond the edges of the splices occurred. Splicing by such technique, however, is satisfactory for those types of operations wherein the presence of the protrusion is not objectionable.

It should be understood that in operating the splicing horn, its entire end surface (including the spaces on both sides of, and between, the bosses) is in contact with the paper web because the shims 23 and 25, and the Teflon tape, are actually so thin as not to space the rest of the horn end from the web. Such full contact is also assured by the slight yielding of shims, tape and paper under pressure.

We have found that fiberglass tape has two unique qualities. First of all it can relay the vibrations from the horn to the paper with little adverse effect on energy transmission. Second, the fiberglass acts as an insulator to prevent heat dissipation into the horn and/or anvil, thus assuring a satisfactory splice.

The benefits of using a fiber glass Teflon coating alone (without bosses) were appraised by splicing 1 ½ inch wide webs of polyethylene-coated paper, using a horn whose active end area was a 1 ½ inches × ¼ inches, and a 40,000 cycles per second piezoelectric transducer. It was found that the fiber glass — Teflon tape gave greatly improved dry splice strengths when operating parameters of the transducer so departed from the optimum that a poor splice would otherwise result. When splicing was conducted at force and power levels substantially lower than optimal, and impedance levels were mismatched between the ultrasonic generator and the transducer (as may occur in production operations), the fiber glass — Teflon coating turned unsatisfactory splice parameters into satisfactory ones. For example, with a power of 75 watts and a splicing time of 2.5 seconds, the straight pull tensile strength of a dry 1 inch wide splice was only about 3 pounds when spliced without Teflon tape on the horn, compared to about 29 pounds when spliced with Teflon tape on the horn; and under the same conditions, but with impedance match tap position of 4 the tensile strength was only about 8 pounds without Teflon tape on the horn, compared to about 31 pounds with Teflon tape.

The invention has been described in detail with particular reference to preferred embodiments thereof, but it will be understood that variations and modifications can be effected within the spirit and scope of the invention.

We claim:

1. An ultrasonic horn for ultrasonically splicing two webs with thermoplastic resin surfaces, said horn having a planar end surface rectangular in shape for engaging a surface of said webs, said rectangular end surface having two parallel long edges and two parallel shorter edges having thereon a pair of spaced bosses positioned so as to extend in a direction parallel to the shorter edges of said rectangular end surface, said spaced parallel bosses projecting a distance of up to about 0.005 inch from said rectangular end surface, said distance being sufficiently small that, when said horn is brought into contact with said webs, ultrasonic splicing occurs over the entire area of said rectangular end surface.

2. Ultrasonic splicing apparatus for splicing two webs with thermoplastic resin surfaces, said apparatus comprising an anvil having a planar surface and an ultrasonic horn having a planar end surface rectangular in shape for engaging a surface of said webs and having two parallel long edges and two parallel shorter edges; said anvil and said horn being relatively movable toward and away from one another into and out of splicing position and said rectangular end surface being adapted to cooperate with the planar surface of said anvil; said horn being oriented with respect to said anvil such that the longer edges of said rectangular end surface lie in a direction parallel to the joint formed by said splicing apparatus; one of either the planar surface of said anvil or the rectangular end surface of said horn having thereon a pair of spaced bosses positioned so as to extend in a direction parallel to the shorter edges of said rectangular end surface or said bosses being located one on each of said surfaces; each of said spaced parallel bosses projecting a distance of up to about 0.005 inch from the surface on which it is located; said distance being sufficiently small that, when said horn is brought into contact with said webs, ultrasonic splicing occurs over the entire area of said rectangular end surface.

3. An ultrasonic horn in accordance with claim 1, wherein said bosses are spaced 1/16 to ⅛ inch inwardly of the shorter edges of said rectangular end surface.

4. An ultrasonic splicing apparatus in accordance with claim 2 wherein each of said bosses is spaced inwardly between 1/16 and ⅛ inch with respect to the shorter edges of said rectangular end surface.

5. An ultrasonic horn in accordance with claim 1 wherein said rectangular end surface is entirely covered with a layer comprising a fluorocarbon resin.

6. An ultrasonic horn in accordance with claim 5 wherein said fluorocarbon resin is carried by fiberglass tape.

7. An ultrasonic splicing apparatus in accordance with claim 2 wherein said rectangular end surface is entirely covered with a layer comprising a fluorocarbon resin.

8. An ultrasonic splicing apparatus in accordance with claim 7 wherein said fluorocarbon resin is carried by fiberglass tape.

* * * * *